Jan. 24, 1928.
J. L. PHILLIPS
1,657,278
RESILIENT WHEEL
Filed May 23, 1927
2 Sheets-Sheet 1
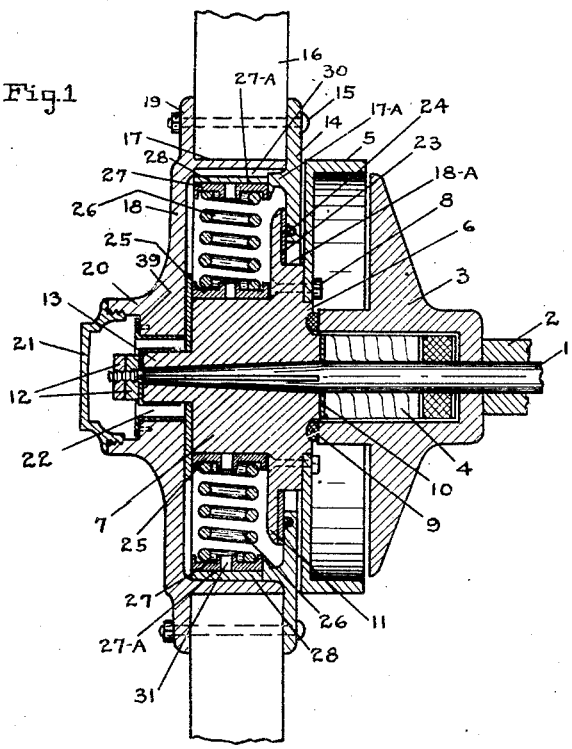
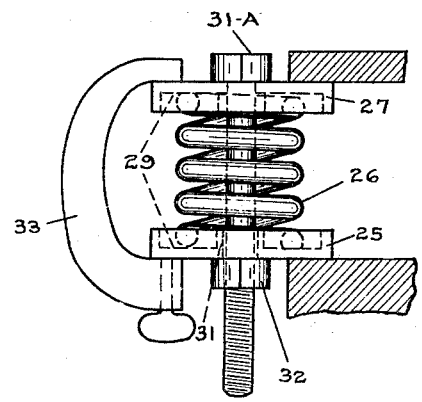
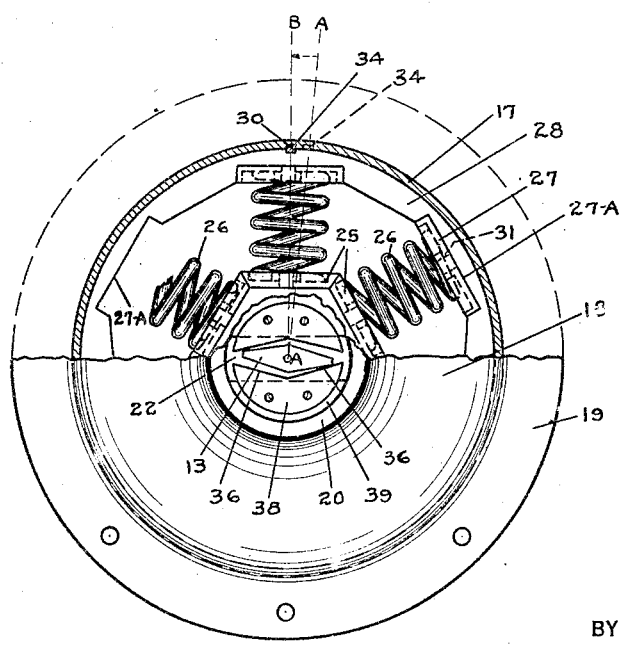
INVENTOR
James L. Phillips.
BY
ATTORNEY Jan. 24, 1928.  
J. L. PHILLIPS  
RESILIENT WHEEL  
Filed May 23, 1927  
1,657,273  
2 Sheets-Sheet 2
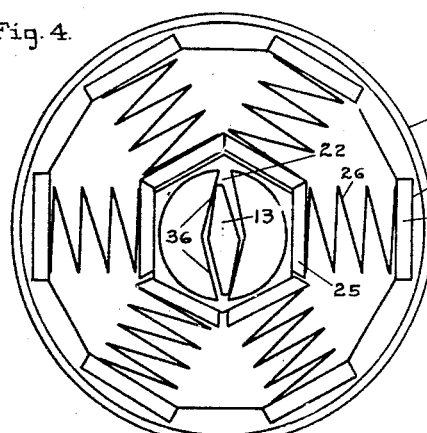
Fig. 4.
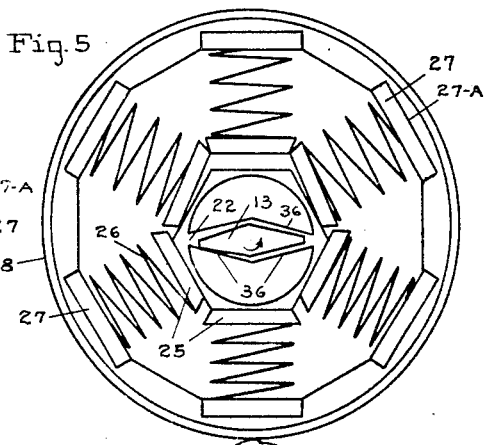
Fig. 5.
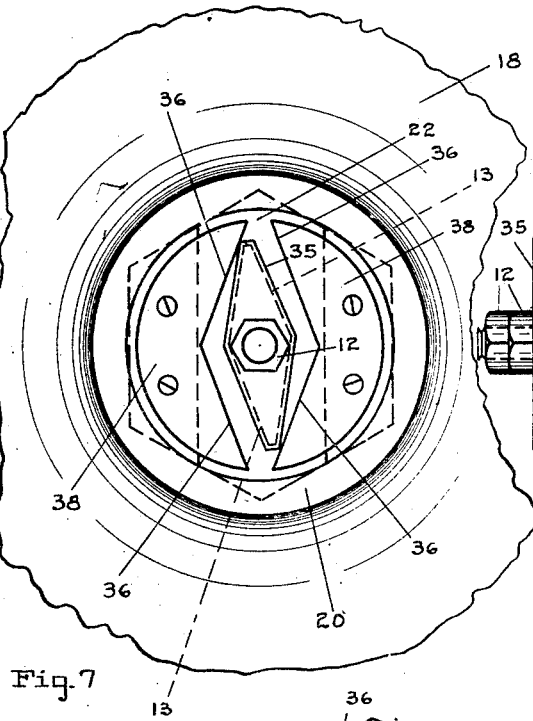
Fig. 7.
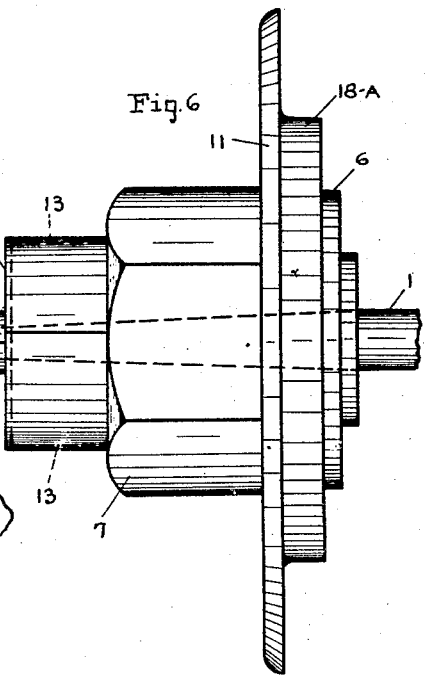
Fig. 6.
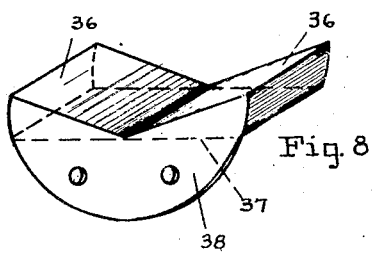
Fig. 8.
INVENTOR  
James L. Phillips.  
BY 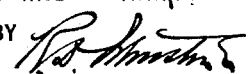  
ATTORNEY Patented Jan. 24, 1928.

1,657,278

UNITED STATES PATENT OFFICE.

JAMES L. PHILLIPS, OF ENSLEY, ALABAMA.

RESILIENT WHEEL.

Application filed May 23, 1927. Serial No. 193,705.

My invention relates to a resilient wheel hub adapted yieldably to support a driving or driven wheel so as to absorb shocks like a pneumatic tire and therefore to permit non-pneumatic tires to be used on the wheel.

My invention as applied to the driving wheel involves the novel idea of a positive floating drive between the axle, or an element rotatable therewith, and the wheel proper, or an element rotatable therewith, which will permit the requisite radial play to enable interposed springs or resilient supports to function in a practical and operative manner to absorb the shocks received by the wheel.

A further distinctive feature is the arrangement of parts which relieves the springs or resilient supports from all traction duty and undue eccentric displacement, this being cared for by the floating interlock between the driving and driven elements of the hub.

A further distinctive feature of my invention is the manner of placing the load bearing springs under tension by a slight torsion to right or left, according to whether the wheel is a right or left hand driving wheel, and utilizing this tension to hold the positive driving elements in engagement so that all back lash is prevented.

A further distinctive feature of my invention relates to the assembling of the resilient supports and their keepers between the driving and driven elements of the hub, the novelty consisting in the fact that the resilient members as independent units are adapted to be placed initially under the requisite compression for supporting the calculated load before they are introduced into operating position on the hub and thus the assembled resilient supports have an initial deformation which corresponds in degree to the inflation of the pneumatic tire and varies with the duty expected of the wheel.

A further distinctive feature is the provision of the spring units with rigid outer bearings and inner abutting bearing seats which are adapted to surround and slidably seat on a polygonal axle bearing, this arrangement serving to permit the axle bearing to play and fully compress the load bearing springs without fully expanding the diametrically opposite springs which thus hold their compression and serve better to prevent undue rebound.

My invention further comprises also the novel details of construction and arrangement of parts, which in their preferred embodiment only are illustrated in the accompanying drawings, in which:—

Fig. 1 is a vertical cross-sectional view through the hub of a driving wheel, the design shown being that adapted for a well known, light, inexpensive car.

Fig. 2 is a view of the outer end of the hub with the hub cap removed and with the outer hub plate partly broken away to show the resilient supports and their bearings in end elevation.

Fig. 3 is a detail view showing the manner of initially compressing and inserting the spring units.

Figs. 4 and 5 are diagrammatic views showing the wheel spring bearings and drive under different operating conditions.

Fig. 6 is a detail side elevation of the spring bearing sleeve and thrust collar.

Fig. 7 is an elongated front view of the hub center with the hub cap removed to show the positive floating driving connections in front elevation.

Fig. 8 is a detail perspective view of a detachable wear plate for the hub.

Similar reference numerals refer to similar parts throughout the drawings.

Referring to my invention which is shown as applied to the driving wheel, 1 is a rear axle having a housing 2 and a rear axle brake housing 3 within which is mounted a standard type of axle shaft roller bearing 4. The brake housing 3 carries any usual type of brake, not shown, as the same forms no part of my invention. The brake mechanism carried by the housing 3 is adapted to co-act with a brake drum 5 having a central opening which fits snugly on the reduced cylindrical inner end 6 of a bushing 7, bolts 8 serving to connect the brake drum to the bushing. This bushing is bored to form a taper center opening to receive the taper end of the axle 1 and its cylindrical end 6 is circumferentially grooved to hold an annular packing 9 against which the outer end of the brake housing 3 bears, a washer 10 being interposed between the bushing and the roller bearings 4 in the manner well understood in this art.

The bushing 7 has an integral thrust collar 11 offset from the inner face of the extension 6. Outwardly beyond the collar 11 the bushing throughout its main body portion is hexagonal in cross-section, terminating at its outer end in an oblong driving element forming driving arms 13 which taper symmetrically towards their outer end and through which element the reduced threaded end of the axle 1 projects to receive the retaining nuts 12. The bushing and brake drum are thus mounted fast on the shaft to rotate therewith and the bushing through its arms 13 forms the driving element of the hub. Interposed between the brake drum and the thrust collar 11 with clearance for radial play is an annular plate 14, the outer periphery of which is perforated to receive the bolts 15 that secure the wheel spokes 16 to the hub. These spokes are mounted on a hub rim 17 formed by an inwardly disposed annular flange carried by the outer hub plate 18 which has a flange 19 corresponding to the flange on plate 14 and adapted to receive the other end of the bolts 15. The hub plate 18 flares outwardly at its center to form a hub extension 20 that is internally threaded to receive the cap 21 that encloses the nuts 12. The hub extension 20 has an elongated socket 22 symmetrically tapered towards each end on angles corresponding to the taper of the driving arms 13. This socket 22 is materially larger than and substantially symmetrical with the bushing extension 13 but not so large that the latter can have more than a limited angular play therein, as is better illustrated in Fig. 7. The major and minor axes of the driving element 13 and its socket 22 differ materially in length, the difference equaling the floating or radial play which the wheel hub is designed to permit between its driving and driven elements. In other words, by referring to Fig. 2, it will be apparent that the driving element 13 may have substantial play in the socket 22 or the hub collar may have an equal floating play about the element 13, but throughout such play the diagonally opposite inclined walls of the socket 22 will be engaged by the arms 13 to receive therefrom the driving thrust while still permitting the wheel or axle to move relatively and freely in all directions to the full extent of the play provided for between them.

The plate 14 is provided with an outwardly disposed annular shoulder 17$^A$ about which the inner end of the spoke rim 17 fits snugly. The plate 14 at its center has an enlarged opening surrounding the annular shoulder 18$^A$ of the bushing and spaced therefrom sufficiently to avoid contact therewith throughout the relative play between the driving and driven elements of the hub. This plate on its outer face engages a fiber washer 23 which covers the inner face of the thrust collar 11 on the bushing 7, an annular packing ring or fabric washer 24 being interposed in the plate to seal the joint and prevent escape of grease through this inner thrust bearing. An outer thrust bearing is provided between the hub plate 18 and the outer end of the hexagon body of the bushing 7, a fiber washer being interposed also at this point to take the wear. The bushing and its thrust collar thus is held free for radial play only between the rigidly connected hub members 14 and 18 and they furnish the lateral or end thrust bearings for the wheel.

The main body portion of the bushing is polygonal in cross-section, the form shown being hexagonal and upon each face of the bushing is mounted an inner retainer plate 25 for the coil springs 26 which are typical of any resilient element. These springs at their outer ends engage retainer blocks 27, which in turn are seated fixedly in countersunk seats 27$^A$ in the outer spring bearing sleeve or ring 28. The retainer blocks 27 are co-extensive with the seats 27$^A$ and the blocks 25 are also on their inner faces as wide as the flat faces of the bushing which they respectively engage. The ends of the blocks 25 are beveled and the blocks abut about the hexagonal bushing. The opposing faces of each pair of blocks 25, 27 are provided with countersunk seats 29 which receive and center their respective spring. The outer periphery of the ring 28 is circular and fits with a snug close fit in the spoke rim 17 to which it may be secured by a key 30.

It is especially to be noted that the retainer blocks 25 and 27, which with their interposed spring form a spring unit, are separately insertable and detachable from the hub assembly and this arrangement is of great importance in that it makes each spring or resilient supporting unit independently detachable and replaceable. The greatest importance of this arrangement, however, is that it permits me to compress each resilient unit so as to bring it under the predetermined preliminary compression before it is inserted between the bushing and ring 28 and in this way the springs are brought under compression with exactly the same effect as when a pneumatic tire is blown up to the requisite air compression for the load thereon. To permit of the safe and easy compression of the springs and their insertion under compression, I form the blocks 25 and 27 with aligning center openings 31 through which I insert a long threaded bolt 31$^A$ causing it to pass centrally through the interposed spring. By screwing up the nut 32 on the bolt I draw the blocks together and compress the spring while at all times holding it so it cannot escape. After sufficiently compressing the spring, the spring unit has a clamp 33 applied to one end and its other end is then inserted between the bushing and ring 28 and pushed in until the bolt nearly engages the ring, whereupon the nut and bolt are detached and the blocks driven home, the clamp being stripped off as the spring unit finally enters its seat, and it is thus left free to function. The reverse operation takes place when it is desired to remove a spring unit.

The high initial compression under which the spring units work and the provision of the opposite driving arms 13 to give an equal thrust on both sides of the driven elements center, both combine to reduce to the minimum the eccentric play between the driving and driven elements in the hub except that which is determined, empirically, to be necessary to give the desired easy riding effect. Moreover, the bushing, springs and ring 28 form by themselves a complete detachable unit, which can be readily removed, changed and replaced in the hub.

It is to be noted that the pressure of the spring blocks 25, 27 against their respective seats will tend to hold the faces of the bushing parallel with the seats 27$^A$. The arms 13 and socket 22 are designed to interfit when these spring seats are parallel. To prevent back lash in the wheel drive it is necessary to hold the driving arms 13 always pressed against the socket walls in the direction of the drive. To accomplish this I cut the seat 34 for the key 30 to the right or left of the seat for that key in the ring 28, according to whether the wheel is a right or left hand wheel. In Fig. 2 I show the right hand wheel driving forward and the dotted line A—A indicates the extent to which the key seat 34 stands to the right of the key seat in ring 28 when the parts are assembled. By pulling the spoke rim back to bring the seat 34 into position with the line A—B, I place a slight torsion or lateral tension on the springs which in seeking to right themselves will act at all times to hold the arms 13 pressed firmly as shown against the right hand driving faces of the socket 22.

It is to be noted that the springs are practically free of any traction load, this being taken care of entirely by the driving interlock between the hub extension and bushing.

If desired to reduce wear, I may apply over the driving arms a detachable high carbon steel wear plate 35 held in place by the nuts 12, and for the socket 22, I may, if desired, form its top and bottom walls parallel and mount on each a detachable wear plate, see Fig. 8, having the tapering ends 36 and the flat under or upper bearing face 37. An end flange 38 on the wear plate is adapted to be inserted in the hub and bolted to the seats 39 thereon.

In operation, having assembled the parts as described, the hub chamber is packed with grease or dope and is preferably kept charged with this under all operating conditions. This will take care of the friction between hub plate 18 and bushing 7 and between the flange plate 14 and thrust collar 11 which are the only wearing points in the hub. The springs, having been brought under the requisite initial compression by clamping their retainer blocks together before insertion in the wheel, and removing their clamps as they are inserted, will be free to rebound buoyantly and play about the axle, or the axle may float in the ring 28 with the requisite play to give the buoyant riding qualities desired.

It will be noted by reference to Figs. 4 and 5 that in both views the upper spring blocks 25 are bridged and have not entirely followed the bushing in its downward displacement. This important result is obtained by having the base blocks 25 abutting and free to slide on the bushing seats. Fig. 4 shows a normal load displacement of the bushing in the ring 28. Here the driving arms have slipped down along the long axis of the socket and the bushing has slipped down between the two side blocks 25, pushing the two lower blocks down before it and leaving the two top blocks bridged on the side blocks and holding their springs under practically full compression. In Fig. 5 I show a road obstruction abnormally displacing the bushing and ring. Here the bushing is pushing the three under blocks 25 down and the three upper blocks are bridged. Also the up thrust of the socket acting on the left driving arm 13 has caused it to rock about the axle as a fulcrum and displace the right arm 13 from engaging the socket. A still greater displacement will cause a solid bearing of the arms on the under side of the socket in Fig. 5, or the engagement of both sides of one arm 13 in one end of the socket, as disposed in Fig. 4.

The bridged springs, holding their compression will act to effectively stop the pitch or toss which tends to follow the downward displacement of the axle, as they are set to stop the rebound of the bushing and restore the driving parts almost instantaneously to normal relation. In other words, the spring supports will quickly right the car after a severe jolt or bump. The wheel itself may be equipped with a non-pneumatic tire and will give with this resilient hub the same easy riding buoyant effect as a wheel with pneumatic tires.

I claim that these results are essentially dependent upon the following novel principles involved in my construction, to-wit:— The floating interlock between the relatively movable driving and driven elements of the hub; the spring pressure as applied to prevent back lash; the inter-position of the resilient supporting members of all engaging parts in a grease filled hub assembly, which is compact and substantially free of impractical frictional contacts where any excessive wear might occur. These features I claim broadly and without intention to limit myself to the preferred details of construction shown.

Having thus described my invention, what I claim as new and desire to secure by Letters Patent, is:—

1. In a resilient wheel, a hub having an oblong central opening, a driving element having an oblong projection adapted to fit into said oblong opening with ample clearance for free eccentric play of the hub about it, and radial springs under compression interposed between the hub and driving element to yieldably support the former.

2. A resilient wheel as described in claim 1, in which the hub comprises an outer end plate in which said oblong central hub opening is formed.

3. A resilient wheel as described in claim 1, in which the hub comprises an outer end plate having a boss through which an oblong central hub opening extends.

4. A resilient wheel as described in claim 1, in which the driving element has its oblong projection fast on its outer end and projecting equi-distantly on each side thereof, and the hub comprises an outer plate rigid therewith in the center of which said oblong central hub opening is formed.

5. In a resilient wheel, a spring bearing sleeve adapted to be mounted on an axle and having a single pair of driving arms fast on an end thereof, a hub surrounding the sleeve and having an end plate rigid therewith and provided with an oblong central opening in which said driving arms are received with a clearance to permit the necessary eccentric play of the hub about the sleeve, and springs under compression mounted between the hub and sleeve.

6. A resilient wheel as described in claim 5, in which the driving arms are formed by reducing the outer end of said sleeve.

7. A resilient wheel as described in claim 5, in which the driving arms are formed by reducing the end of said sleeve to form a reversely tapered symmetrical extension, the ends of the extension forming the driving elements.

8. A resilient wheel as described in claim 5, in which the opening in the hub plate to receive said arms lies in the central zone of said plate having approximately the diameter of said sleeve.

9. A resilient wheel hub, comprising an inner member adapted to be mounted fast on an axle, an outer spoke bearing member adapted to enclose said inner member free for eccentric movement thereabout, rigid end hub plates on said outer member, means on the inner member adapted to engage the outer member and hold said members in assembled position, radially disposed coiled springs interposed under heavy compression between said members, driving arms rigid with the inner member and lying within an axial projection of its spring supporting surface, and seats for said driving arms formed by outwardly converging spaced walls on the said outer member.

10. In a resilient wheel hub, a hub proper comprising a peripheral spoke support and rigid end plates, an axle sleeve mounted in the hub, oppositely disposed drivers in the hub rotatable with the sleeve, radially disposed coiled springs interposed under heavy compression in said hub to yieldably mount it on said sleeve, there being an enlarged central opening in one hub plate surrounding said sleeve, and seats for the said drivers formed in the other hub plate and having outwardly converging walls adapted to be engaged by said drivers.

11. A resilient wheel hub as described in claim 10, in which the converging walls of the driver seats are straight and relatively inclined to form substantially symmetrical outwardly tapered seats.

12. In a resilient wheel, a hub, an inner spring support, a positive drive means having relatively movable elements adapted to form a floating driving connection between said hub and its supporting axle, and radial independently removable spring units interposed between said spring support and hub and comprising each a pair of spring seats having interposed a coil spring normally under heavy compression and adapted to be further compressed when the load of the vehicle is imposed thereon.

13. A resilient wheel as described in claim 12, in which the hub is provided with a sleeve forming an outer spring bearing and which is removable from the hub with said spring support.

14. A resilient wheel as described in claim 12, in which the hub is provided with a sleeve forming an outer spring bearing and which is removable from the hub with said spring support, said sleeve and support having flat seats forming opposite pairs each adapted to receive and hold between them a spring unit.

15. A resilient wheel as described in claim 12, in which the hub is provided with a sleeve forming an outer spring bearing and which is removable from the hub with said spring support, said sleeve and support having flat seats forming opposite pairs adapted to receive and hold between them said spring units and in which means are provided to secure the sleeve to the hub and the spring support to said axle.

16. A resilient wheel hub comprising an inner member adapted to be mounted fast on the axle, an outer member free for radial movement about the axle, means to retain said members in assembled position, yieldable means interposed under load bearing compression between said members, means to provide a floating driving connection between said members, and means to yieldingly hold said driving members in engagement to prevent back lash.

17. A resilient wheel hub comprising an inner member adapted to be mounted fast on the axle, an outer member free for eccentric movement about the axle, means to retain said members in assembled position, yieldable means under load bearing compression interposed between said members, means to provide a floating interlock between said members, said latter means comprising an oblong member on one element interposed in an oblong socket on the other member, and means utilizing the tension of said yieldable means to hold said interlocked driving members continuously engaged.

18. A resilient wheel having a polygonal inner spring seat adapted to be secured fast on a driving axle, springs mounted under compression on said polygonal seat, a bearing in which the outer ends of the springs are fixedly mounted, a floating positive drive connection between said inner seat and the wheel, and means to secure said outer bearing to the wheel in a position to produce a tension on said springs adapted to press said driving connections together to prevent back lash.

19. In a resilient hub, the combination with a spoke supporting rim member and an axle supported inner member, of a ring surrounding said inner member, opposed flat seats on said inner member and ring, resilient supports having end retaining plates between which they are compressed and inserted between opposed parallel seats on the inner member and ring, means to hold the outer plates against circumferential displacement in said ring seats, the spoke supporting member being rotatable about said ring, means to key the supporting member and ring together with the opposed spring seats slightly out of parallel relation, means to hold said members in assembled position, and means to provide a floating interlock between the inner and outer hub members.

20. In a resilient wheel hub, an axle having a polygonal bearing, an abutting series of spring seats mounted on and about said bearing, springs mounted under compression on said seats, means to hold the outer ends of the springs fixedly in the wheel hub, and a floating positive drive between hub and axle.

21. In a resilient wheel, a hub having radial springs inserted therein under heavy compression, inner seats for said springs which abut to form a polygonal sectional spring support, an axle member also polygonal and adapted to support and relatively displace the inner spring seats, and a positive floating drive between the hub and axle members.

22. In a resilient wheel, a hub having radial springs inserted therein under heavy compression and having a driving and supporting connection at their outer ends to the hub, an axle having a polygonal inner spring bearing and inner spring seats which normally engage said bearing with their side edges bevelled and abutting, said bearing being free to slide relatively to said seats as it is displaced, and means to form a positive floating drive between hub and axle members.

23. In a resilient wheel, an outer driven member, an inner driving member, means to hold said members in assembled relation, and yieldable means to space said members comprising a series of units each having a resilient element and end plates having aligning openings for the reception of a removable bolt having a nut threaded thereon and adapted to bring the parts of the unit under the desired compression.

24. A resilient wheel, as described in claim 23, in which said openings are sufficiently spaced from the side of the unit to permit the latter to be partly introduced into its seat in the wheel before the bolt is removed.

In testimony whereof I affix my signature.

JAMES L. PHILLIPS.